United States Patent [19]

Fujimoto et al.

[11] Patent Number: 5,296,298
[45] Date of Patent: Mar. 22, 1994

[54] SILICONE RUBBER COMPOSITION AND SILICONE RUBBER-PROCESSED FABRIC

[75] Inventors: Tetsuo Fujimoto; Yasuji Matsumoto, both of Tokyo, Japan

[73] Assignee: Toshiba Silicone Co., Ltd., Tokyo, Japan

[21] Appl. No.: 978,338

[22] Filed: Nov. 18, 1992

[30] Foreign Application Priority Data

Nov. 22, 1991 [JP] Japan .................. 3-307603

[51] Int. Cl.$^5$ ............................. B32B 25/02
[52] U.S. Cl. .................. 428/447; 428/474.4; 428/480; 524/265; 524/266; 524/267; 524/268; 524/730; 524/731; 528/14; 528/15
[58] Field of Search ............ 528/15, 14; 524/730, 524/731, 265, 267, 266, 268; 428/447, 474.4, 480

[56] References Cited

U.S. PATENT DOCUMENTS

4,980,413  12/1990  Kasuya .................. 524/730
5,166,293  11/1992  Okinoshima et al. ........ 528/15

FOREIGN PATENT DOCUMENTS

| | | |
|---|---|---|
| 53-33256 | 3/1978 | Japan . |
| 54-48853 | 4/1979 | Japan . |
| 56-151758 | 11/1981 | Japan . |
| 60-101146 | 6/1985 | Japan . |
| 2-270654 | 11/1990 | Japan . |
| 3-223362 | 10/1991 | Japan . |
| 4-39036 | 2/1992 | Japan . |

*Primary Examiner*—Melvyn I. Marquis
*Attorney, Agent, or Firm*—Sughrue, Mion, Zinn, Macpeak & Seas

[57] ABSTRACT

A silicone rubber composition comprising
(A) 100 parts by weight of a polyorganosiloxane having, per molecule, at least two structural units represented by the following formula:

$$(R^1)_a(R^2)_b SiO_{(4-(a+b))/2} \qquad (I);$$

(B) a polyorganohydrogensiloxane comprising structural units shown by the following formula:

$$(R^3)_c H_d SiO_{(4-(c+d))/2} \qquad (II)$$

and having at least three silicon-bonded hydrogen atoms per molecule, the amount of component (B) being such that the number of silicon-bonded hydrogen atoms in component (B) is from 0.5 to 4.0 per $R^1$ group in the structural units shown by formula (I) of component (A), (C) from 0.1 to 10 parts by weight of a compound selected from the group consisting of an organosilicon compound having, per molecule, at least one silicon-bonded hydrogen atoms and at least one group represented by the following formula:

$$\equiv Si - Q^1 - \underset{\underset{O}{\|}}{C} - O - Q^2 - Si(R^4)_e(OR^5)_{3-e} \qquad (III);$$

and an acrylic- or methacrylic-functional silane coupling agent, (D) from 0.1 to 10 parts by weight of an epoxyalkylalkoxysilane represented by the following formula:

$$X - Q^3 - Si(R^6)_f(OR^7)_{3-f} \qquad (IV);$$

(E) from 0 to 5 parts by weight of an aluminum chelate compound, and (F) platinum and/or a platinum compound in an amount of from 1 to 100 ppm of the polyorganosiloxane, component (A), in terms of the amount of platinum atoms.

All groups and subscripts are identified in the specification.

10 Claims, No Drawings

SILICONE RUBBER COMPOSITION AND SILICONE RUBBER-PROCESSED FABRIC

FIELD OF THE INVENTION

The present invention relates to a silicone rubber composition having excellent self-adhesive properties and to a silicone rubber-processed fabric obtained by impregnating and/or coating a synthetic fiber fabric with the silicone rubber composition

BACKGROUND OF THE INVENTION

Since silicone rubbers are excellent in heat resistance, durability, weatherability, and other properties, they are being extensively used in applications in which these performances are required.

In particular, so-called addition reaction type silicone rubbers which are cured by forming crosslinks between a vinyl group-containing polyorganosiloxane and a hydrosilyl group-containing polyorganosiloxane by means of addition reaction are used as fiber-coating materials, because curing of these silicone rubbers proceeds rapidly upon heating at relatively low temperatures and the rubbers after cure have water repellency and water vapor permeability which are inherent characteristics in silicones.

However, silicone rubbers of this kind originally have poor adhesive properties and have had problems concerning the property of bonding or adhering to fibers. As an expedient for this, it has been attempted to impart self-adhesive properties to silicone rubbers by adding a suitable additive ingredient to silicone rubber raw compositions. However, this technique has failed to impart sufficient adhesive properties to especially synthetic fiber fabrics, in particular nylon fiber fabrics and polyester fiber fabrics. Hence, there has been a desire for such a silicone rubber-processed fabric.

SUMMARY OF THE INVENTION

One object of the present invention is to provide a silicone rubber composition having excellent adhesive properties and bonding durability.

Another object of the present invention is to provide a synthetic fiber fabric impregnated and/or coated with the composition.

The present inventors conducted intensive studies in order to attain the above objects and, as a result, it has been found that a silicone rubber composition having the composition as specified below has the desired performances. The present invention has thus been accomplished.

Accordingly, the present invention provides a silicone rubber composition comprising (A) 100 parts by weight of a polyorganosiloxane having, per molecule, at least two structural units represented by the following formula:

$$(R^1)_a(R^2)_b SiO_{(4-(a+b))/2} \quad (I)$$

wherein $R^1$ represents an alkenyl group; $R^2$ represents a substituted or unsubstituted monovalent hydrocarbon group containing no aliphatic unsaturated bonds; a represents 1 or 2; b represents 0, 1, or 2; and a+b represents 1, 2, or 3, (B) a polyorganohydrogensiloxane comprising structural units represented by the following formula:

$$(R^3)_c H_d SiO_{(4-(c+d))/2} \quad (II)$$

wherein $R^3$ represents a substituted or unsubstituted monovalent hydrocarbon group; c represents 0, 1, or 2; d represents 1 or 2; and c+d represents 1, 2, or 3 and having at least three silicon-bonded hydrogen atoms per molecule, the amount of component (B) being such that the number of silicon-bonded hydrogen atoms in component (B) is from 0.5 to 4.0 per $R^1$ group in the structural units represented by formula (I) of component (A), (C) from 0.1 to 10 parts by weight of a compound selected from the group consisting of an organosilicon compound having, per molecule, at least one silicon-bonded hydrogen atom and at least one group represented by the following formula:

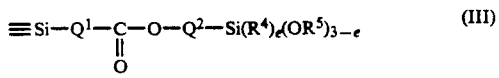

$$\equiv Si-Q^1-\underset{\underset{O}{\|}}{C}-O-Q^2-Si(R^4)_e(OR^5)_{3-e} \quad (III)$$

wherein $Q^1$ and $Q^2$ each represents a divalent hydrocarbon group; $R^4$ and $R^5$ each represents a monovalent hydrocarbon group having from 1 to 4 carbon atoms; and e represents 0 or 1 and an acrylic- or methacrylic-functional silane coupling agent, (D) from 0.1 to 10 parts by weight of an epoxyalkylalkoxysilane represented by the following formula:

$$X-Q^3-Si(R^6)_f(OR^7)_{3-f} \quad (IV)$$

wherein $Q^3$ represents a divalent hydrocarbon group having from 1 to 4 carbon atoms; $R^6$ and $R^7$ each represents a monovalent hydrocarbon group having from 1 to 4 carbon atoms; X represents glycidoxy group or epoxycyclohexyl group; and f represents 0 or 1, (E) from 0 to 5 parts by weight of an aluminum chelate compound, and (F) platinum and/or a platinum compound in an amount of from 1 to 100 ppm of the polyorganosiloxane, component (A), in terms of the amount of platinum atoms.

The present invention further provides a silicone rubber-processed fabric obtained by impregnating and/or coating a synthetic fiber fabric with the silicone rubber composition described above.

DETAILED DESCRIPTION OF THE INVENTION

The polyorganosiloxane, component (A), used in the present invention has, per molecule, at least two structural units which contain a silicon-bonded alkenyl group and are represented by the formula (I). The polyorganosiloxane can be either a straight-chain or a branched polyorganosiloxane and it is also possible to use a mixture thereof.

Examples of the alkenyl group as $R^1$ group in formula (I) above include vinyl, allyl, 1-butenyl, and 1-hexenyl. Of these, vinyl group is most advantageous from the standpoints of easiness of synthesis, thermal stability, and so forth.

Examples of $R^2$ group and examples of possible silicon-bonded organic groups other than $R^1$ and $R^2$ groups include alkyl groups such as methyl, ethyl, propyl, butyl, hexyl, and dodecyl; aryl groups such as phenyl; and aralkyl groups such as β-phenylethyl and β-phenylpropyl, and further include substituted hydrocarbon groups such as chloromethyl and 3,3,3-trifluoropropyl. Of these groups, methyl group is most preferred as $R^2$ group, because component (A) in which $R^2$ group is methyl can be easily synthesized and because the methyl group imparts a degree of polymerization necessary for retaining good physical properties after cure and also imparts a low viscosity before cure.

The structural units represented by formula (I) may be present either at an end of the polyorganosiloxane molecular chain or in the molecular chain. It is, however, preferable that a structural unit of formula (I) be present at at least one of the ends of the molecular chain in order to impart excellent mechanical properties to the cured elastomer to be obtained from the composition.

It is preferred that the polyorganosiloxane, component (A), have a viscosity of from 100 to 500,000 cP at 25° C.

The polyorganohydrogensiloxane, component (B), used in the present invention is required to have at least three silicon-bonded hydrogen atoms per molecule in order to enable the composition to have a network structure through crosslinking. Examples of $R^3$ group in formula (II) above and examples of possible silicon-bonded organic groups other than $R^3$ group include the same groups as those enumerated above with reference to $R^2$ in component (A). Of these, methyl group is most preferred as $R^3$ from the standpoint of easiness of synthesis.

It is preferred that component (B) have a viscosity of from 1 to 10,000 cP at 25° C. from the standpoint of easiness of synthesis and handling.

The polyorganohydrogensiloxane can be any of a straight-chain, branched, and cyclic structures and it is also possible to use a mixture of these.

The amount of component (B) to be added to the composition is such that the number of silicon-bonded hydrogen atoms in component (B) is from 0.5 to 4.0, preferably from 1.0 to 3.0, per alkenyl group in component (A). If the number of such hydrogen atoms is below 0.5 per alkenyl group, the composition does not cure sufficiently to have low hardness after cure. If the number of such hydrogen atoms exceeds 4.0, the composition after cure has poor mechanical properties.

The organosilicon compound which may be used as one of component (C) in the present invention is a component which serves, when used in combination with component (D), to impart excellent adhesive performance to the silicone rubber composition of the present invention. This organosilicon compound has at least one silicon-bonded hydrogen atom per molecule and further has, per molecule, at least one group represented by the following formula:

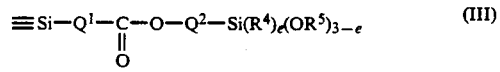   (III)

wherein $Q^1$, $Q^2$, $R^4$, $R^5$, and e are the same as defined hereinabove. Although this compound usually is a silane derivative or a polysiloxane derivative, it is preferred from the standpoint of easiness of synthesis that the organosilicon compound be one having a polysiloxane backbone in which an Si-H bond and the group represented by formula

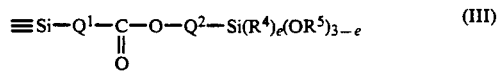   (III)

are contained in separate siloxane units. Preferred examples of $Q^1$ are hydrocarbon groups comprising a carbon chain having 2 or more carbon atoms, from the standpoints of easiness of synthesis and resistance to hydrolysis, and especially preferred examples of $Q^1$ are groups represented by the formula

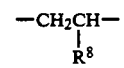

wherein $R^8$ represents a monovalent group selected from hydrogen atom and methyl group. Preferred examples of $Q^2$ are hydrocarbon groups comprising a carbon chain having 3 or more carbon atoms, especially propylene group, from the standpoint of resistance to hydrolysis. Examples or $R^4$ and $R^5$ include alkyl groups having from 1 to 4 carbon atoms, such as methyl, ethyl, propyl, isopropyl, and butyl, with methyl and ethyl groups being preferred from the standpoint of giving good adhesive properties. A siloxane unit containing such a side chain can be synthesized by the addition reaction of a trialkoxy- or dialkoxysilylpropyl ester of acrylic or methacrylic acid with part of the Si-H bonds in the molecule of a compound to be the organosilicon compound, or by a similar method. The siloxane backbone of such an organosilicon compound may be either cyclic or chain form, or may be a mixture thereof. From the standpoint of easiness of synthesis, however, the organosilicon compound most preferably is one having a cyclic polysiloxane backbone. In the case that an organosilicon compound having a cyclic polysiloxane backbone is used, the number of silicon atoms constituting the siloxane ring is from 3 to 6, preferably 4, from the standpoint of easiness of synthesis. In the case that an organosilicon compound in chain form is used, the number of silicon atoms constituting the siloxane chain is from 2 to 20, preferably from 4 to 10, because too high a molecular weight results in an increased viscosity, making the synthesis and handling of the compound difficult.

The acrylic- or methacrylic-functional silane coupling agent which is another component of component (C) is a component for imparting adhesive properties to the composition of the present invention, like the organosilicon compound described above. The function and effect of this silane coupling agent are improved significantly by combined use with component (D), especially with components (D) and (E).

Specific examples of the silane coupling agent of component (C) include γ-methacryloxypropyltrimethoxysilane, γ-methacryloxypropyltriethoxysilane, γ-acryloxypropyltrimethoxysilane, γ-acryloxypropyltriethoxysilane, methacryloxymethyltrimethoxysilane, and acryloxymethyltrimethoxysilane.

The amount of component (C) to be added to the composition is from 0.1 to 10 parts by weight, preferably from 1 to 8 parts by weight, per 100 parts by weight of component (A). If the amount of component (C) added is below 0.1 part by weight, the rubbery elastomer to be obtained from the composition fails to have self-adhesive properties. If the amount thereof exceeds 10 parts by weight, the rubbery elastomer has poor elasticity.

Component (D) used in the present invention is an epoxyalkylalkoxysilane represented by formula (IV). This component (D) is a component for improving adhesive properties.

Preferred examples of the divalent hydrocarbon group having from 1 to 4 carbon atoms which is represented by $Q^3$ in formula (IV) are alkylene groups having from 1 to 4 carbon atoms.

Preferred examples of the monovalent hydrocarbon group having from 1 to 4 carbon atoms which is represented by each of $R^6$ and $R^7$ are alkyl groups having from 1 to 4 carbon atoms.

Specific examples of component (D) include γ-glycidoxypropyltrimethoxysilane, γ-glycidoxypropylmethyldimethoxysilane, 3,4-epoxycyclohexylethyltrimethoxysilane, and 3,4-epoxycyclohexylethylmethyldimethoxysilane.

The amount of component (D) to be added to the composition is from 0.1 to 10 parts by weight, preferably from 1 to 8 parts by weight, per 100 parts by weight of component (A). If the amount of component (D) added is below 0.1 part by weight, the rubbery elastomer to be obtained from the composition fails to have self-adhesive properties. If the amount thereof exceeds 10 parts by weight, the rubbery elastomer has poor elasticity.

Component (E) used in the present invention is an aluminum chelate compound which serves to further enhance bondability when used in combination with components (C) and (D) described above.

Specific examples of component (E) include aluminum ethylacetoacetate diisopropylate, aluminum tris(ethylacetoacetate), aluminum tris(acetylacetonate), and aluminum bisethylacetoacetate monoacetylacetonate.

The amount of component (E) to be added to the composition is from 0 to 5 parts by weight, preferably from 0.1 to 3 parts by weight, per 100 parts by weight of component (A). If the amount of component (E) added exceeds 5 parts by weight, the rubbery elastomer to be obtained from the composition has poor elasticity.

The platinum and/or platinum compound used as component (F) in the present invention is a catalyst which accelerates the addition reaction between alkenyl groups in component (A) and hydrosilyl groups in component (B). Specific examples of this component include elemental platinum, chloroplatinic acid, platinum-olefin complexes, platinum-alcohol complexes, and platinum coordination compounds. Component (F) is used in an amount of from 1 to 100 ppm, preferably from 5 to 50 ppm, of component (A) in terms of the amount of platinum atoms. If the amount of component (F) added is below 1 ppm, the effect of the present invention cannot be produced. On the other hand, even if component (F) is used in an amount exceeding 100 ppm, any improvement in curing speed or other effects cannot particularly be expected.

If required and necessary, a filler may be additionally added to the silicone rubber composition of the present invention at any time. Further, the composition may be used in combination with a solvent according to purpose, and may also be used in combination with other polyorganosiloxanes so long as the effect of the present invention is not impaired. Examples of such additives usually include fumed silica, precipitated silica, quartz powder, diatomaceous earth, glass beads, toluene, hexane, polydimethylsiloxane, and the like.

The silicone rubber-processed fabric according to the present invention is obtained by impregnating and/or coating a synthetic fiber fabric with the silicone rubber composition comprising components (A), (B), (C), (D), (E), and (F) as described above. Examples of the synthetic fiber fabric include nylon fiber fabrics, polyester fiber fabrics, polyurethane fiber fabrics, glass fiber fabrics, and aramid fiber fabrics. Of these, processing with the silicone rubber composition is useful especially to nylon fiber and polyester fiber fabrics for which conventional processing materials have been unable to show sufficient adhesive properties.

The silicone rubber-processed fabric of the present invention can be easily obtained by impregnating and/or coating a synthetic fiber fabric with the silicone rubber composition described above and then heat-curing the applied composition. For this process, a method may be used in which a solvent such as toluene or xylene is added to the silicone rubber composition if required and the processing of a synthetic fiber fabric with the composition is conducted by a coating technique using a knife coater, doctor coater, reverse-roll coater, or the like.

The silicone rubber composition of the present invention has excellent self-adhesive properties and is, hence, suitable for use in a variety of applications. In particular, since the silicone rubber-processed fabric obtained by impregnating and/or coating a synthetic fiber fabric with the composition is excellent in adhesion between the silicone rubber and synthetic fibers, it is useful in applications such as various sportswear and air bag fabrics.

The present invention will be explained below in more detail with reference to the following Examples and Comparative Examples, but the invention should not be construed as being limited to the Examples. In these examples, all parts are by weight.

EXAMPLE 1

100 Parts of a polydimethylsiloxane terminated at both ends by a dimethylvinyl group and having a viscosity of 5,000 Cp at 25° C., 3 parts of a polymethylhydrogensiloxane comprising $(CH_3)_2HSiO_{1/2}$ units and $SiO_2$ units, containing 0.98% by weight of silicon-bonded hydrogen atoms, and having a viscosity of 20 cP at 25° C., 50 parts of a quartz powder having an average particle diameter of 2 μm, 2 parts of organosilicon compound A as specified below, 2 parts of γ-glycidoxypropyltrimethoxysilane, 0.3 part of aluminum bisethylacetoacetate monoacetylacetonate, and an isopropyl alcohol solution of chloroplatinic acid in an amount of 20 ppm (in terms of platinum amount based on the amount of the polydimethylsiloxane) were mixed to uniformly disperse the ingredients, thereby preparing present invention composition 1. This composition was poured into the space (2 mm distance) between two 6-nylon resin plates each having dimensions of 50 mm×25 mm×2 mm, and then cured by heating it at 70° C. for 6 hours. The shear bond strength and percentage of cohesive failure for the cured composition were measured, and the results obtained are shown in Table 1.

Organosilicon compound A;

2. Using various plastic resins as adherends, the shear bond strength and percentage of cohesive failure for each composition were measured. The results obtained are shown in Table 2.

TABLE 1

| | Example | | | | | | | | | | | | |
|---|---|---|---|---|---|---|---|---|---|---|---|---|
| | 1 | 2 | | | | 3 | | | | 4 | | | |
| Component (C), amount | organosilicon compound A, 2 parts | organosilicon compound A, 4 parts | | | | organosilicon compound A, 6 parts | | | | organosilicon compound A, 6 parts | | | |
| Component (D), amount | γ-glycidoxy-propyltri-methoxysilane, 2 parts | γ-glycidoxypropylmethyl-dimethoxysilane, 4 parts | | | | 3,4-epoxycyclohexyl-ethyltrimethoxysilane, 6 parts | | | | 3,4-epoxycyclohexyl-ethyltrimethoxysilane, 6 parts | | | |
| Component (E), amount | aluminum bi-sethylacetate monoacetyl-acetonate, 0.3 part | aluminum tris(ethyl-acetoacetate), 1 part | | | | aluminum tris(acetyl-acetonate), 2 parts | | | | — | | | |
| Plastic resin | 6-nylon | 6-nylon | 6,6-nylon | phenol-ic | epoxy | 6-nylon | 6,6-nylon | phenol-ic | epoxy | 6-nylon | 6,6-nylon | phenol-ic | epoxy |
| Shear bond strength, kgf/cm² | 19.8 | 18.6 | 19.2 | 22.6 | 20.8 | 18.0 | 19.1 | 20.4 | 19.8 | 13.1 | 14.2 | 15.3 | 14.7 |
| Percentage of cohesive failure, % | 100 | 100 | 100 | 100 | 100 | 100 | 100 | 100 | 100 | 100 | 100 | 100 | 100 |

TABLE 2

| | Comparative Example | |
|---|---|---|
| | 1 | 2 |
| Component (C), amount | — | organosilicon compound A, 2 parts |
| Component (D), amount | γ-glycidoxypropyltrimethoxysilane, 2 parts | — |
| Component (E), amount | aluminum bisethylacetate monoacetylacetonate, 0.3 part | — |
| Plastic resin | 6-nylon | 6-nylon 6,6-nylon phenolic epoxy |
| Shear bond strength, kgf/cm² | 4.3 | 4.6 4.9 11.0 10.6 |
| Percentage of cohesive failure, % | 30 | 60 60 100 100 |

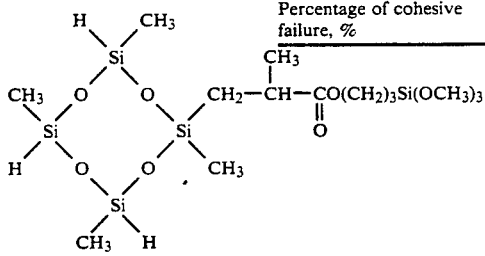

EXAMPLES 2 TO 4

Present invention compositions 2 to 4 were prepared in the same manner as in Example 1 except that as components (C), (D), and (E), the compounds shown in Table 1 were used.

Each of these compositions was poured into the space between two plates of each of various plastic resins, each plate having dimensions of 50 mm×25 mm×2 mm. The compositions poured were then cured by heating them at 100° C. for 30 minutes. The shear bond strength and percentage of cohesive failure for each cured composition were measured, and the results obtained are shown in Table 1.

COMPARATIVE EXAMPLES 1 AND 2

Comparative compositions 1 and 2 were prepared in the same manner as in Example 1 except that components (C), (D), and (E) were omitted as shown in Table

EXAMPLE 5

100 Parts of a polydimethylsiloxane terminated at both ends by a dimethylvinyl group and having a viscosity of 20,000 cP at 25° C., 2 parts of a straight-chain polymethylhydrogensiloxane terminated at both ends by a trimethylsilyl group and having a silicon-bonded hydrogen content of 0.88% by weight and a viscosity of 30 cP at 25° C., 10 parts of fumed silica, 5 parts of organosilicon compound B as specified below, 1 part of γ-glycidoxypropyltrimethoxysilane, 2 parts of aluminum bisethylacetoacetate monoacetylacetonate, and an isopropyl alcohol solution of chloroplatinic acid in an amount of 10 ppm (in terms of platinum amount based on the amount of the polydimethylsiloxane) were mixed to uniformly disperse the ingredients, thereby preparing present invention composition 5. This composition was poured into the space between two 6,6-nylon resin plates each having dimensions of 50 mm×25 mm×2 mm, and then cured by heating it at 120° C. for 20 minutes. The shear bond strength for the cured composition was measured. As a result, the bond strength was 22.3 kgf/cm², with the percentage of cohesive failure being 100%.

Organosilicon compound B;

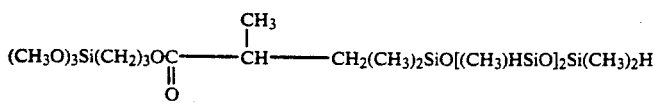

COMPARATIVE EXAMPLE 3

Comparative composition 3 was prepared and the shear bond strength therefor was measured, in the same manner as in Example 5 except that γ-glycidoxypropyltrimethoxysilane was omitted. As a result, the bond strength was 8.4 kgf/cm², with the percentage of cohesive failure being 70%.

EXAMPLE 6

100 Parts of a polydimethylsiloxane terminated at both ends by a dimethylvinyl group and having a viscosity of 3,000 cP at 25° C., 3 parts of a straight-chain polymethylhydrogensiloxane terminated at both ends by a trimethylsilyl group and having a silicon-bonded hydrogen content of 0.85% by weight and a viscosity of 25 cP at 25° C., 20 parts of fumed silica, 5 parts of γ-methacryloxypropyltrimethoxysilane, 5 parts of γ-glycidoxypropyltrimethoxysilane, 1 part of aluminum bisethylacetoacetate monoacetylacetonate, and an isopropyl alcohol solution of chloroplatinic acid in an amount of 10 ppm (in terms of platinum amount based on the amount of the polydimethylsiloxane) were mixed to uniformly disperse the ingredients, thereby preparing present invention composition 6.

This composition was poured into the space between two 6-nylon resin plates each having dimensions of 50 mm × 25 mm × 2 mm, and then cured by heating it at 80° C. for 3 hours. The shear bond strength and percentage of cohesive failure for the cured composition were measured, and the results obtained are shown in Table 3.

EXAMPLES 7 TO 9

Present invention compositions 7 to 9 were prepared in the same manner as in Example 6 except that as components (C), (D), and (E), the compounds shown in Table 3 were used.

Each of these compositions was poured into the space between two plates of each of various plastic resins, each plate having dimensions of 50 mm × 25 mm × 2 mm. The compositions poured were then cured by heating them at 100° C. for 30 minutes. The shear bond strength and percentage of cohesive failure for each cured composition were measured, and the results obtained are shown in Table 3.

COMPARATIVE EXAMPLES 4 AND 5

Comparative compositions 4 and 5 were prepared in the same manner as in Example 6 except that components (C), (D), and (E) were omitted as shown in Table 4. Using various plastic resins as adherends, the shear bond strength and percentage of cohesive failure for each composition were measured. The results obtained are shown in Table 4.

TABLE 3

| | Example | | | | | | | | | | | | |
|---|---|---|---|---|---|---|---|---|---|---|---|---|---|
| | 1 | 2 | | | | 3 | | | | 4 | | | |
| Component (C), | γ-methacryloxypropyl trimethoxysilane, | γ-methacryloxypropyl trimethoxysilane, | | | | γ-acryloxypropyl trimethoxysilane, | | | | γ-methacryloxypropyl trimethoxysilane, | | | |
| amount | 5 parts | 2 parts | | | | 7 parts | | | | 3 parts | | | |
| Component (D), | γ-glycidoxypropyltrimethoxysilane, | γ-glycidoxypropylmethyldimethoxysilane, | | | | 3,4-epoxycyclohexylethyltrimethoxysilane, | | | | γ-glycidoxypropyltrimethoxysilane, | | | |
| amount | 5 parts | 2 parts | | | | 3 parts | | | | 7 parts | | | |
| Component (E), | aluminum bisethylacetate monoacetylacetonate, | aluminum tris(ethylacetoacetate), | | | | aluminum tris(ethylacetonate), | | | | — | | | |
| amount | 1 part | 0.2 part | | | | 2 parts | | | | | | | |
| Plastic resin | 6-nylon | 6-nylon | 6,6-nylon | phenolic | epoxy | 6-nylon | 6,6-nylon | phenolic | epoxy | 6-nylon | 6,6-nylon | phenolic | epoxy |
| Shear bond strength, kgf/cm² | 16.4 | 15.5 | 16.4 | 18.8 | 18.2 | 15.2 | 15.8 | 18.4 | 17.8 | 10.8 | 11. | 11.6 | 10.9 |
| Percentage of cohesive failure, % | 100 | 100 | 100 | 100 | 100 | 100 | 100 | 100 | 100 | 100 | 100 | 100 | 100 |

TABLE 4

| | Comparative Example | |
|---|---|---|
| | 4 | 5 |
| Component (C), | — | γ-methacryloxypropyltrimethoxysilane, |
| amount | | 3 parts |
| Component (D), | γ-glycidoxypropyltrimethoxysilane, | — |
| amount | 5 parts | |
| Component (E), | aluminum bisethylacetate monoacetylacetonate, | — |
| amount | 1 part | |
| Plastic resin | 6-nylon | 6-nylon 6,6-nylon phenolic epoxy |

TABLE 4-continued

| | Comparative Example | | | | |
|---|---|---|---|---|---|
| | 4 | 5 | | | |
| Shear bond strength, kgf/cm² | 3.8 | 3.1 | 2.9 | 6.5 | 6.3 |
| Percentage of cohesive failure, % | 40 | 30 | 30 | 60 | 60 |

EXAMPLE 10

100 Parts of a polydimethylsiloxane terminated at both ends by a dimethylvinyl group and having a viscosity of 30,000 cP at 25° C., 2 parts of a polymethylhydrogensiloxane comprising $(CH_3)_2HSiO_{1/2}$ units and $SiO_2$ units, containing 1.01% by weight of silicon-bonded hydrogen atoms, and having a viscosity of 20 cP at 25° C., 80 parts of a quartz powder having an average particle diameter of 5 μm, 2 parts of methacryloxymethyltrimethoxysilane, 4 parts of γ-glycidoxypropyltrimethoxysilane, 0.5 part of aluminum bisethylacetoacetate monoacetylacetonate, and an isopropyl alcohol solution of chloroplatinic acid in an amount of 30 ppm (in terms of platinum amount based on the amount of the polydimethylsiloxane) were mixed to uniformly disperse the ingredients, thereby preparing present invention composition 10.

This composition was poured into the space between two 6,6-nylon resin plates each having dimensions of 50 mm×25 mm×2mm, and then cured by heating it at 100° C. for 30 minutes. The shear bond strength for the cured composition was measured. As a result, the bond strength was 15.7 kgf/cm², with the percentage of cohesive failure being 100%.

COMPARATIVE EXAMPLE 6

Comparative composition 6 was prepared and the shear bond strength therefor was measured, in the same manner as in Example 10 except that γ-glycidoxypropyltrimethoxysilane was omitted. As a result, the bond strength was 6.2 kgf/cm², with the percentage of cohesive failure being 30%.

EXAMPLE 11

100 Parts of a polydimethylsiloxane terminated at both ends by a dimethylvinyl group and having a viscosity of 25,000 cP at 25° C., 2.5 parts of a polymethylhydrogensiloxane comprising $(CH_3)_2HSiO_{1/2}$ units and $SiO_2$ units, containing 1.01% by weight of silicon-bonded hydrogen atoms, and having a viscosity of 23 cP at 25° C., 40 parts of a quartz powder having an average particle diameter of 2 μm, 2 parts of organosilicon compound A as specified above, 2 parts of γ-glycidoxypropyltrimethoxysilane, 0.2 part of aluminum bisethylacetoacetate monoacetylacetonate, and an isopropyl alcohol solution of chloroplatinic acid in an amount of 20 ppm (in terms of platinum amount based on the amount of the base oil) were mixed to uniformly disperse the ingredients, thereby preparing present invention composition 11.

This composition was poured into the space between two fabric bases (20 mm×200 mm) made of synthetic fibers of each of various kinds as shown in Table 5, and then cured by heating it at 100° C for 30 minutes. The test pieces thus prepared were subjected to a peeling test in accordance with JIS K 6328 (clause 5.3.7) to measure adhesion strength. The results obtained are shown in Table 5. Further, toluene was added to the present invention composition 11 in an amount so as to result in a viscosity of 6,000 cP, and the resulting composition was coated on fabric bases made of various synthetic fibers shown in Table 5 by means of a knife coater at a coating film thickness of 20 μm and was then heat-cured at 150° C. for 5 minutes, thereby obtaining silicone rubber-processed fabrics. These processed fabrics were subjected to a crease-flex test (conducted 1,000 times without load) in accordance with JIS K 6328 (clause 5.3.8) to examine the state of peeling between the silicone rubber and the fabric base. The results obtained are shown in Table 5.

EXAMPLES 12 TO 14

Present invention compositions 12 to 14 were prepared in the same manner as in Example 11 except that as components (C), (D), and (E), the compounds shown in Table 5 were used. Each of these compositions was coated on fabric bases made of various synthetic fibers and a peeling test and crease-flex test were performed in the same manner as in Example 11. The results obtained are shown in Table 5.

COMPARATIVE EXAMPLES 7 TO 9

Comparative compositions 7 to 9 were prepared in the same manner as in Example 11 except that components (C), (D), and (E) were omitted as shown in Table 6. Each of these compositions was coated on fabric bases made of various synthetic fibers and a peeling test and crease-flex test were performed, in the same manner as in Example 11. The results obtained are shown in Table 6.

TABLE 5

| | Example | | | |
|---|---|---|---|---|
| | 11 | 12 | 13 | 14 |
| Component (C), amount | organosilicon compound A, 2 parts | organosilicon compound A, 8 parts | organosilicon compound A, 1 part | organosilicon compound A, 5 parts |
| Component (D), amount | γ-glycidoxypropyl-trimethoxysilane, 2 parts | γ-glycidoxypropyl-triethoxysilane, 1 part | 3,4-epoxycyclohexyl-ethyltrimethoxysilane, 7 parts | γ-glycidoxypropyl-methyldimethoxysilane 5 parts |
| Component (E), amount | aluminum bisethyl-acetoacetate mono-acetylacetonate, 0.2 part | aluminum tris(ethyl-acetoacetate), 3 parts | aluminum tris(acetyl-acetonate), 1 part | — |
| Synthetic fiber | 6,6-nylon   poly-ester   glass   acrylic | 6,6-nylon   poly-ester   glass   acrylic | 6,6-nylon   poly-ester   glass   acrylic | 6,6-nylon   poly-ester   glass   acrylic |

TABLE 5-continued

| | Example | | | | | | | | | | | | | | |
|---|---|---|---|---|---|---|---|---|---|---|---|---|---|---|---|
| | 11 | | | | 12 | | | | 13 | | | | 14 | | |
| fabric base | | | | | | | | | | | | | | | |
| Adhesion strength, (warp direction) kgf/cm | 2.4 | 2.6 | 1.3 | 1.3 | 2.3 | 2.5 | 1.4 | 1.6 | 2.1 | 2.2 | 1.2 | 1.4 | 1.6 | 1.8 | 1.1 | 1.3 |
| Crease-flex text | no abnormality in 1000-time flexing | ← | ← | ← | ← | ← | ← | ← | ← | ← | ← | ← | ← | ← | ← |

TABLE 6

| | Comparative Example | | | | | | | | | | | | |
|---|---|---|---|---|---|---|---|---|---|---|---|---|---|
| | 7 | | | | 8 | | | | 9 | | | | |
| Component (C), amount | — | | | | — | | | | organosilicon compound A, 5 parts | | | | |
| Component (D), amount | — | | | | γ-glycidoxypropyl-trimethoxysilane, 1 part | | | | — | | | | |
| Component (E), amount | — | | | | aluminum bisethylacetoacetate monoacetylacetonate, 0.2 part | | | | — | | | | |
| Synthetic fiber fabric base | 6,6-nylon | polyester | glass | acrylic | 6,6-nylon | polyester | glass | acrylic | 6,6-nylon | polyester | glass | acrylic |
| Adhesion strength, (warp direction) kgf/cm | 0.1 or less | 0.1 or less | 0.5 | 0.2 | 0.5 | 0.3 | 0.8 | 0.7 | 0.3 | 0.2 | 0.7 | 0.6 |
| Crease-flex test | rubber peeled in 100-time flexing | rubber peeled in 100-time flexing | rubber peeled in 500-time flexing | rubber peeled in 200-time flexing | rubber peeled in 400-time flexing | rubber peeled in 300-time flexing | rubber peeled in 700-time flexing | rubber peeled in 700-time flexing | rubber peeled in 200-time flexing | rubber peeled in 200-time flexing | rubber peeled in 700-time flexing | rubber peeled in 500-time flexing |

EXAMPLE 15

100 Parts of a polydimethylsiloxane terminated at both ends by a dimethylvinyl group and having a viscosity of 3,000 cP at 25° C., 3 parts of a straight-chain polymethylhydrogensiloxane terminated at both ends by a trimethylsilyl group and having a silicon-bonded hydrogen content of 0.90% by weight and a viscosity of 21 cP at 25° C., 10 parts of fumed silica, 5 parts of organosilicon compound B as specified above, 2 parts of γ-glycidoxypropyltrimethoxysilane, 2 parts of aluminum bisethylacetoacetate monoacetylacetonate, and an isopropyl alcohol solution of chloroplatinic acid in an amount of 10 ppm (in terms of platinum amount based on the amount of the polydimethylsiloxane) were mixed to uniformly disperse the ingredients, thereby preparing present invention composition 12.

This composition was coated on a fabric base made of 6-nylon fibers with a knife coater at a coating film thickness of 40 μm and was then heat-cured at 170° C. for 3 minutes, thereby obtaining a silicone rubber-processed fabric. This processed fabric was subjected to a crease-flex test in the same manner as in Example 11. As a result, no abnormality was observed even after 1,000-time flexing.

COMPARATIVE EXAMPLE 10

A silicone rubber-processed fabric was produced and a crease-flex test was performed, in the same manner as in Example 15 except that γ-glycidoxypropyltrimethoxysilane was omitted. As a result, peeling of the rubber from the 6-nylon fiber fabric was observed when flexing had been conducted 600 times.

EXAMPLE 16

100 Parts of a polydimethylsiloxane terminated at both ends by a dimethylvinyl group and having a viscosity of 10,000 cP at 25° C., 2 parts of a straight-chain polymethylhydrogensiloxane terminated at both ends by a trimethylsilyl group and having a silicon-bonded hydrogen content of 0.90% by weight and a viscosity of 20 cP at 25° C., 15 parts of fumed silica, 3 parts of γ-methacryloxypropyltrimethoxysilane, 3 parts of γ-glycidoxypropyltrimethoxysilane, 0.2 part of aluminum bisethylacetoacetate monoacetylacetonate, and an isopropyl alcohol solution of chloroplatinic acid in an amount of 20 ppm (in terms of platinum amount based on the amount of the polydimethylsiloxane) were mixed to uniformly disperse the ingredients, thereby preparing present invention composition 16. This composition was poured into the space between two fabric bases (20 mm×200 mm) made of synthetic fibers of each of various kinds as shown in Table 7, and then cured by heating it at 120° C. for 20 minutes. The test pieces thus prepared were subjected to a peeling test in accordance with JIS K 6328 (clause 5 3.7) to measure adhesion strength. The results obtained are shown in Table 7.

Further, toluene was added to the present invention composition 16 in an amount so as to result in a viscosity of 10,000 cp, and the resulting composition was coated on fabric bases made of various synthetic fibers shown in Table 7 by means of a knife coater at a coating film thickness of 30 μm and was then heat-cured at 120° C. for 20 minutes, thereby obtaining silicone rubber-processed fabrics. These processed fabrics were subjected to a crease-flex test (conducted 1,000 times without load) in accordance with JIS K 6328 (clause 5.3.8) to examine the state of peeling between the silicone rubber and the fabric base. The results obtained are shown in Table 7.

EXAMPLES 17 TO 19

Present invention compositions 17 to 19 were prepared in the same manner as in Example 16 except that as components (C), (D), and (E), the compounds shown in Table 7 were used. Each of these compositions was coated on fabric bases made of various synthetic fibers and a peeling test and crease-flex test were performed, in the same manner as in Example 16. The results obtained are shown in Table 7.

COMPARATIVE EXAMPLES 11 TO 13

Comparative compositions 11 to 13 were prepared in the same manner as in Example 16 except that components (C), (D), and (E) were omitted as shown in Table 8. Each of these compositions was coated on fabric bases made of various synthetic fibers and a peeling test and crease-flex test were performed, in the same manner as in Example 16. The results obtained are shown in Table 8.

EXAMPLE 20

100 Parts of a polydimethylsiloxane terminated at both ends by a dimethylvinyl group and having a viscosity of 2,000 cP at 25° C., 2 parts of a polymethylhydrogensiloxane comprising $(CH_3)_2HSiO_{1/2}$ units and $SiO_2$ units, containing 0.98% by weight of silicon-bonded hydrogen atoms, and having a viscosity of 30 cP at 25° C., 100 parts of a quartz powder having an average particle diameter of 5 μm, 2 parts of methacryloxymethyltrimethoxysilane, 3 parts of γ-glycidoxypropyltriethoxysilane, 0.5 part of aluminum bisethylacetoacetate monoacetylacetonate, and an isopropyl alcohol solution of chloroplatinic acid in an amount of 40 ppm (in terms of platinum amount based on the amount of the polydimethylsiloxane) were mixed to uniformly disperse the ingredients, thereby preparing present invention composition 20. This composition was coated on a fabric base made of 6-nylon fibers with a knife coater at a coating film thickness of 20 μm and was then heat-cured at 150° C. for 5 minutes, thereby obtaining a silicone rubber-processed fabric. This pro-

TABLE 7

| | Example 16 | | | | Example 17 | | | | Example 18 | | | | Example 19 | | | |
|---|---|---|---|---|---|---|---|---|---|---|---|---|---|---|---|---|
| Component (C), amount | γ-methacryloxypropyltrimethoxysilane, 3 parts | | | | γ-acryloxypropyltrimethoxysilane 7 parts | | | | γ-methacryloxypropyltriethoxysilane, 1 part | | | | γ-methacryloxypropyltrimethoxysilane, 1 part | | | |
| Component (D), amount | γ-glycidoxypropyltrimethoxysilane, 3 parts | | | | γ-glycidoxypropyltriethoxysilane, 7 parts | | | | 3,4-epoxycyclohexylethyltrimethoxysilane, 5 parts | | | | γ-glycidoxypropyltrimethoxysilane 5 parts | | | |
| Component (E), amount | aluminum bisethylacetoacetate monoacetylacetonate, 0.2 part | | | | aluminum tris(acetylacetonate), 3 parts | | | | aluminum tris(acetylacetonate), 1 part | | | | — | | | |
| Synthetic fiber fabric base | 6,6-nylon | polyester | glass | acrylic | 6,6-nylon | polyester | glass | acrylic | 6,6-nylon | polyester | glass | acrylic | 6,6-nylon | polyester | glass | acrylic |
| Adhesion strength, (warp direction) kgf/cm | 1.8 | 2.2 | 1.1 | 1.0 | 2.0 | 2.3 | 1.3 | 1.4 | 1.9 | 2.1 | 1.3 | 1.5 | 1.3 | 1.4 | 1.0 | 1.0 |
| Crease-flex text | no abnormality in 1000-time flexing | ← | ← | ← | ← | ← | ← | ← | ← | ← | ← | ← | ← | ← | ← | ← |

TABLE 8

| | Comparative Example 11 | | | | Comparative Example 12 | | | | Comparative Example 13 | | | |
|---|---|---|---|---|---|---|---|---|---|---|---|---|
| Component (C), amount | — | | | | — | | | | γ-methacryloxypropyltrimethoxysilane, 7 parts | | | |
| Component (D), amount | — | | | | γ-glycidoxypropyltrimethoxysilane, 5 parts | | | | — | | | |
| Component (E), amount | — | | | | aluminum bisethylacetoacetate monoacetylacetonate, 0.5 part | | | | — | | | |
| Synthetic fiber fabric base | 6,6-nylon | polyester | glass | acrylic | 6,6-nylon | polyester | glass | acrylic | 6,6-nylon | polyester | glass | acrylic |
| Adhesion strength, (warp direction) kgf/cm | 0.1 or less | 0.1 or less | 0.6 | 0.2 | 0.5 | 0.4 | 0.8 | 0.8 | 0.2 | 0.2 | 0.7 | 0.5 |
| Crease-flex test | rubber peeled in 100-time flexing | rubber peeled in 100-time flexing | rubber peeled in 500-time flexing | rubber peeled in 200-time flexing | rubber peeled in 400-time flexing | rubber peeled in 400-time flexing | rubber peeled in 700-time flexing | rubber peeled in 700-time flexing | rubber peeled in 200-time flexing | rubber peeled in 200-time flexing | rubber peeled in 700-time flexing | rubber peeled in 400-time flexing | cessed fabric was subjected to a crease-flex test in the same manner as in Example 11. As a result, no abnormality was observed even after 1,000-time flexing.

COMPARATIVE EXAMPLE 14

A silicone rubber-processed fabric was produced and a crease-flex test was performed, in the same manner as in Example 20 except that γ-glycidoxypropyltriethoxysilane was omitted. As a result, peeling of the rubber from the 6-nylon fiber fabric was observed when flexing had been conducted 500 times.

While the invention has been described in detail and with reference to specific embodiments thereof, it will be apparent to one skilled in the art that various changes and modifications can be made therein without departing from the spirit and scope thereof.

What is claimed is:

1. A silicone rubber composition comprising
(A) 100 parts by weight of a polyorganosiloxane having, per molecule, at least two structural units represented by the following formula:

$$(R^1)_a(R^2)_b SiO_{(4-(a+b))/2} \quad (I)$$

wherein $R^1$ represents an alkenyl group; $R^2$ represents a substituted or unsubstituted monovalent hydrocarbon group containing no aliphatic unsaturated bonds; a represents 1 or 2; b represents 0, 1, or 2; and a+b represents 1, 2, or 3, (B) a polyorganohydrogensiloxane comprising structural units shown by the following formula:

$$(R^3)_c H_d SiO_{(4-(c+d))/2} \quad (II)$$

wherein $R^3$ represents a substituted or unsubstituted monovalent hydrocarbon group; c represents 0, 1, or 2; d represents 1 or 2; and c+d represents 1, 2, or 3 and having at least three silicon-bonded hydrogen atoms per molecule, the amount of component (B) being such that the number of silicon-bonded hydrogen atoms in component (B) is from 0.5 to 4.0 per $R^1$ group in the structural units shown by formula (I) of component (A), (C) from 0.1 to 10 parts by weight of a compound selected from the group consisting of an organosilicon compound having, per molecule, at least one silicon-bonded hydrogen atom and at least one group represented by the following formula:

$$\equiv Si-Q^1-\underset{\underset{O}{\|}}{C}-O-Q^2-Si(R^4)_e(OR^5)_{3-e} \quad (III)$$

wherein $Q^1$ and $Q^2$ each represents a divalent hydrocarbon group; $R^4$ and $R^5$ each represents a monovalent hydrocarbon group having from 1 to 4 carbon atoms; and e represents 0 or 1 and an acrylic- or methacrylic-functional silane coupling agent, (D) from 0.1 to 10 parts by weight of an epoxyalkylalkoxysilane represented by the following formula:

$$X-Q^3-Si(R^6)_f(OR^7)_{3-f} \quad (IV)$$

wherein $Q^3$ represents a divalent hydrocarbon group having from 1 to 4 carbon atoms; $R^6$ and $R^7$ each represents a monovalent hydrocarbon group having from 1 to 4 carbon atoms; X represents glycidoxy group or epoxycyclohexyl group; and f represents 0 or 1, (E) from 0 to 5 parts by weight of an aluminum chelate compound, and (F) platinum and/or a platinum compound in an amount of from 1 to 100 ppm of the polyorganosiloxane, component (A), in terms of the amount of platinum atoms.

2. A composition as claimed in claim 1, wherein the polyorganosiloxane has a viscosity of from 100 to 500,000 cP at 25° C.

3. A composition as claimed in claim 1, wherein the polyorganohydrosiloxane has a viscosity of from 1 to 10,000 cP at 25° C.

4. A composition as claimed in claim 1, wherein the number of silicon-bonded hydrogen atoms in component (B) is 1.0 to 3.0 per $R^1$ group in the structural unit shown by formula (I) of component (A).

5. A composition as claimed in claim 1, wherein the amount of component (C) is from 1 to 8 parts by weight.

6. A composition as claimed in claim 1, wherein the amount of component (D) is from 1 to 7 parts by weight.

7. A composition as claimed in claim 1, wherein the amount of component (E) is from 0.2 to 3 parts by weight.

8. A composition as claimed in claim 1, wherein the amount of component (F) is from 10 to 40 ppm.

9. A silicone rubber-processed fabric obtained by coating a synthetic fiber fabric with the composition as claimed in claim 1.

10. A silicone rubber-processed fabric as claimed in claim 9, wherein the synthetic fiber fabric is a nylon fiber fabric or a polyester fiber fabric.

* * * * *